United States Patent
Chester

(10) Patent No.: US 7,765,382 B2
(45) Date of Patent: Jul. 27, 2010

(54) PROPAGATING RECONFIGURATION COMMAND OVER ASYNCHRONOUS SELF-SYNCHRONOUS GLOBAL AND INTER-CLUSTER LOCAL BUSES COUPLING WRAPPERS OF CLUSTERS OF PROCESSING MODULE MATRIX

(75) Inventor: David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 189 days.

(21) Appl. No.: 11/696,502

(22) Filed: Apr. 4, 2007

(65) Prior Publication Data

US 2008/0250225 A1    Oct. 9, 2008

(51) Int. Cl.
*G06F 15/17* (2006.01)
(52) U.S. Cl. .............................. 712/15; 712/11; 712/37
(58) Field of Classification Search ....................... None
See application file for complete search history.

(56) References Cited

U.S. PATENT DOCUMENTS

| | | | | |
|---|---|---|---|---|
| 6,092,174 A | * | 7/2000 | Roussakov | 712/15 |
| 6,819,140 B2 | | 11/2004 | Yamanaka et al. | 326/93 |
| 7,167,939 B2 | | 1/2007 | Nguyen et al. | 710/120 |
| 7,382,154 B2 | * | 6/2008 | Ramos et al. | 326/38 |
| 7,426,650 B2 | * | 9/2008 | Grass et al. | 713/400 |
| 2001/0003834 A1 | * | 6/2001 | Shimonishi | 709/310 |
| 2005/0060597 A1 | * | 3/2005 | Albonesi et al. | 713/600 |
| 2006/0161797 A1 | | 7/2006 | Grass et al. | 713/400 |
| 2006/0259529 A1 | | 11/2006 | Wood | 708/232 |

FOREIGN PATENT DOCUMENTS

WO        2005/088424        9/2005

* cited by examiner

*Primary Examiner*—Kenneth S Kim
(74) *Attorney, Agent, or Firm*—Allen, Dyer, Doppelt, Milbrath & Gilchrist, P.A.

(57) ABSTRACT

A semiconductor device includes a plurality of processing clusters that operate synchronously internally and arranged in a M×N matrix. Each processing cluster is formed as a plurality of processing elements and clocked buses that interconnect the processing elements within each processing cluster. A self-synchronous cluster wrapper is operative with the processing elements such that each processing cluster forms a programmable module. Self-synchronous global and local buses interconnect the processing clusters for communicating externally. An input/output circuit interconnects the global and local buses.

15 Claims, 5 Drawing Sheets

PROPAGATING RECONFIGURATION COMMAND OVER ASYNCHRONOUS SELF-SYNCHRONOUS GLOBAL AND INTER-CLUSTER LOCAL BUSES COUPLING WRAPPERS OF CLUSTERS OF PROCESSING MODULE MATRIX

FIELD OF THE INVENTION

The present invention relates to semiconductor devices, and more particularly, the present invention relates to semiconductor devices such as globally asynchronous, locally synchronous (GALS) circuits that use local and global buses.

BACKGROUND OF THE INVENTION

The levels of integrated circuit integration continue to increase the gap between size, power, and unit cost. For example, in application spaces requiring high performance signal processing for radio communications and similar applications, the three typical implementation options are (1) ASICs (Application Specific Integrated Circuits); (2) DSPs (digital signal processors); and (3) FPGAs (Field Programmable Gate Arrays). For the advantages that each of these alternatives offer, there are disadvantages as well.

ASICs offer high efficiency in speed, unit size, unit cost, and power consumption. The downside of ASICs is the long time to market. This increases exponentially with gate count and speed, and the resulting NRE (Non-Recurring Engineering) cost in low to moderate volume applications. Digital signal processors, on the other hand, have a high degree of programmability. They can even be reprogrammed "on-the-fly," and their cost is low to moderate, but are highly inefficient because the bulk of their size and substantial power is required for moving data to and from the processing elements, as opposed to actual processing. Field Programmable Gate Arrays can be reprogrammed, but these circuits cannot be programmed "on-the-fly." Also, the logical gate count ratio ranges from about 10 to 1 to about 100 to 1. Coupled with the special processing requirements of a field programmable gate array, the result is an expensive, high power consuming semiconductor device with a moderate lead-time.

Globally asynchronous, locally synchronous (GALS) circuits can overcome the disadvantages of using highly integrated semiconductor components for wireless communication, digital signal processors and modern ASICs. In a GALS circuit, synchronization of different functional blocks integrated on one semiconductor chip is simplified, which can remedy problems associated with the use of global clocks and the use of deep submicron system-on-a-chip (SOC) designs. Some of these devices use a global time clock for functional blocks (circuit modules) that are embodied in the design. A GALS circuit architecture uses a self-timed communication scheme on typically a coarse grained block level, such that major modules are designed with synchronous clocking. Data exchange can occur between two modules using a full handshake protocol, and each module can run from its own local clock. Asynchronous circuitry that coordinates any clock-driven events with a self-timed operation can be confined to "self-timed wrappers" that are arranged around a clock domain. Thus, a GALS circuit architecture can take advantage of industry-standard synchronous design techniques within an individual clock domain and self-timed operation across clock boundaries.

A GALS circuit architecture typically uses circuit blocks or modules that operate internally synchronously, but communicate with each other asynchronously using a handshake communications protocol. For this reason, with GALS circuits, there is no requirement for individual, locally synchronized circuit blocks to be globally synchronized with each other, as long as individual, locally synchronous blocks follow the required handshake protocol. These blocks can also be combined in many different arrangements, resulting in a high degree of flexibility in the circuit design. Synchronous circuits can be integrated with each other.

Some GALS circuits convert the asynchronous communication between the locally synchronous circuit blocks using an asynchronous wrapping circuit, also referred to as an "asynchronous wrapper." This structure includes input and output ports and a local clock signal generator. Asynchronous interfaces can be added to locally synchronous (LS) modules and mitigate the clock distribution problems on these large chips, reduce power consumption in the clock distribution, solve problems of clock skew, and simplify reuse of modules because they do not require the same clock signal.

GALS circuits are thus becoming an increasingly popular circuit architecture. Examples of GALS circuits are disclosed in U.S. Patent Publication Nos. 2006/0259529 and 2006/0161797, and WO 2005/088424, the disclosures which are hereby incorporated by reference in their entirety. Many circuit designers, however, desire the size, processing capability and power consumption of an ASIC, but the programmability of a processor with a data flow architecture.

SUMMARY OF THE INVENTION

A semiconductor device includes a plurality of processing clusters that operate synchronously internally and arranged in a M×N matrix. Each processing cluster is formed as a plurality of processing elements and clocked buses that interconnect the processing elements within each processing cluster. A self-synchronous cluster wrapper is operative with the processing elements such that each processing cluster forms a programmable module. Self-synchronous global and local buses interconnect the processing clusters for communicating externally. An input/output circuit interconnects the global and local buses.

In accordance with another aspect of the present invention, each cluster is formed as a memory element operable with the processing elements. Each processing element can be formed as an Arithmetic Logic Unit (ALU).

A plurality of functional modules can interconnect the input/output circuit and processing clusters to form an ASIC (Application Specific Integrated Circuit). An input/output ring can have input/output ports and interconnect the functional module. The input/output circuit can be formed as an input/output, clocked Boolean logic (CBL) self-synchronous wrapper circuit. The local and global buses can be formed as bidirectional buses. The local buses can be configured for data flow and the global buses can be configured to carry address information, programs and data.

In another aspect, each processing cluster is programmable using a Hardware Description Language (HDL) or software. At least one of the processing clusters can be formed as a RISC microcontroller or state machine. The buses can be programmable using a Hardware Description Language (HDL). The processing clusters and processing elements can be formed as circuits that are configured in clock Boolean logic.

In another aspect, an application specific integrated circuit and method is set forth. Programmable processing clusters can operate synchronously internally and be arranged in a M×N matrix and form a programmable fabric. The functional modules can form an ASIC structure into which the programmable fabric is embedded.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
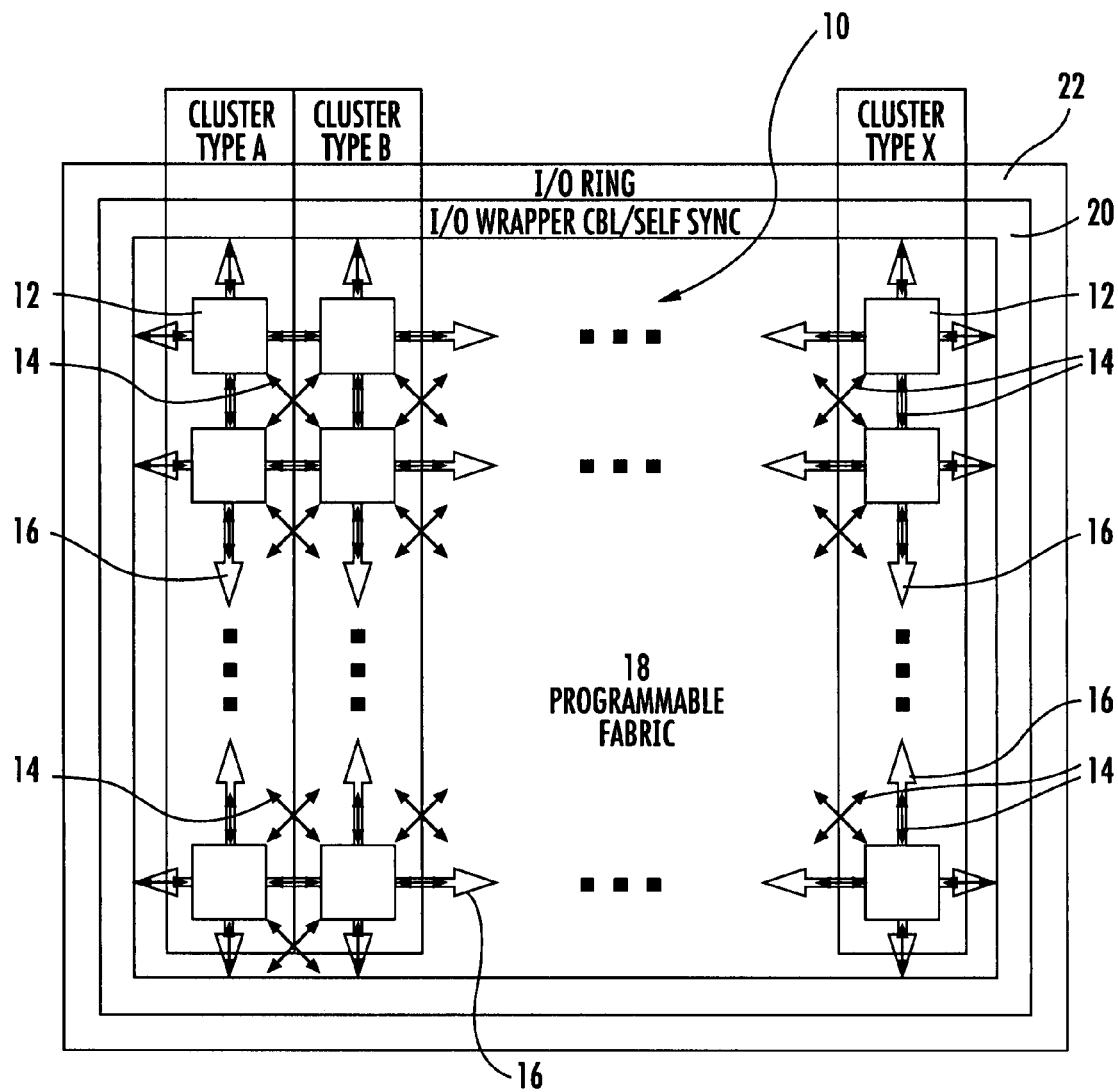
FIG. 1 is a high-level view showing a circuit structure in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example of the present invention, a circuit provides a high performance, flexible, field programmable platform that can operate in harsh environments and be formed as a general purpose, field programmable signal processing platform, for example, an ASIC. The circuit can include computational efficiencies for signal processing algorithms and be programmable in a Hardware Description Language at a coarse level. It can change algorithm sets in a clock cycle and be implemented in multiple processes. The architecture can be targeted to low power software defined radio baseband signal processing applications and similar applications. This programmable circuit structure can also be referred to as the "fabric," and can form a platform ASIC, and enable a flexibility approachable to that of an FPGA in targeted application spaces.

This circuit structure, i.e., "fabric" or programmable fabric, can have two general classes of implementation. For example, one class has a device dominated by the "fabric" or circuit structure itself with few or no fixed or reconfigurable function blocks. This would allow maximum flexibility and a targeted gate count and power consumption efficiency of about a two-to-one over an ASIC. Another device as a second implementation has reconfigurable computational resources required for use across an entire target application space with sections of the programmable circuit structure or "fabric" placed at strategic locations around the die to control configuration of the reconfigurable elements and implement non-common processes. In that implementation, the computational resources for the target application space are identified and mapped to fixed, reconfigurable or programmable functions. The architecture is segmented into a "fixed function or configurable accelerators" and programmable circuit structure with defined characteristics that address requirements of an end application space.

The efficient programmable "fabric" or circuit structure, in accordance with a non-limiting example of the present invention, is applicable across many semiconductor and superconductor processes. This circuit structure facilitates high-speed, parallel data flow processing and a reprogramming methodology in a small set of "processing element" circuits. This structure eliminates the requirements for chip scale timing closure, while enabling fast global communication.

The circuit structure can be implemented as an entire semiconductor device, with the majority of the processing capability in the semiconductor device coupled to specific accelerators. It can also be implemented as an embedded, programmable circuit structure as a defined area within a traditional ASIC architecture. In all cases, however, the programmable circuit structure is populated with a small number of hardware language or software programmable processing clusters. The total number and ratio of each type of programmable processing cluster is predetermined based on the target application space and the end use of the semiconductor device.

Figure 2:
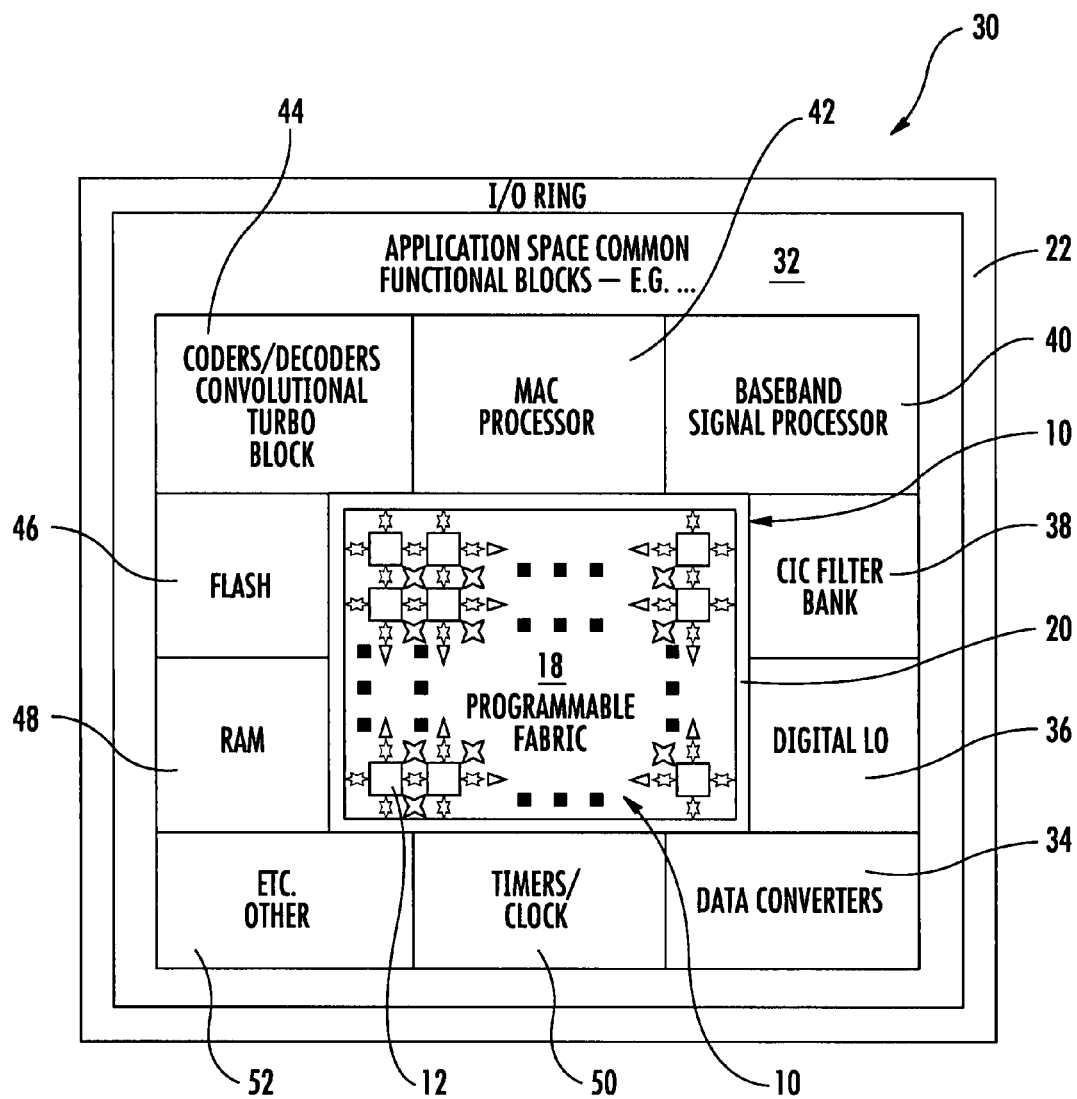
FIG. 2 is another view of the circuit structure shown in FIG. 1 that is embedded in an ASIC device and showing basic functional modules in accordance with a non-limiting example of the present invention.

A programmable circuit structure or "fabric" is shown in FIG. 1, and an instantiation of a traditional ASIC device with the embedded circuit structure or "fabric" of FIG. 1 is shown in FIG. 2.

As shown in FIG. 1, the circuit structure 10 is formed as a semiconductor architecture with a M×N matrix of processing clusters 12 (or blocks) each forming a programmable module and connected by local 14 and global 16 self-synchronous buses. The processing clusters 12 and the buses 14,16 are HDL (Hardware Description Language) programmable for maximum efficiency and flexibility. Selected processing clusters (blocks) can be software programmable if their function is conducive for software programming. For example, RISC microcontroller or state machine blocks are examples of such processing clusters and could be software programmable.

FIG. 1 shows two types of processing clusters 12 as a cluster type A and cluster type B, and another set cluster type X. Intermediate between these processing cluster groups would be further clusters (not shown). The area defined by the processing clusters 12 forms a programmable fabric 18, i.e., programmable circuit structure. The programmable fabric 18 having the various processing clusters 12 includes an Input/Output (I/O) Wrapper Clocked Boolean Logic (CBL) Self-Synchronous Circuit 20. Around the I/O Wrapper CBL/Self-Synchronous Circuit 20 is an Input/Output (I/O) Ring 22 that contains various input/output ports (not illustrated in detail). The ring 22 could be incorporated as part of the circuit structure 10 or spaced as shown in FIG. 2.

The interconnect structure of each cluster 12 has internal clocked buses interfacing intracluster processing elements as will be explained in detail below. Six local, self-synchronous cluster interface buses and two global self-synchronous buses are included. All buses are bidirectional and each processing element with each processing cluster can have multiple inputs and multiple outputs simultaneously. Local buses are used for data flow while global buses are used to carry address information, programs and data.

Processing elements and processing clusters can be designed in any logic type, although Clock Boolean Logic (CBL) is preferred in most cases because of efficiency in gate and wire count. Each processing cluster is effectively its own clock domain, and once timing closure is achieved on the small number of cluster types, no further timing closure is required because of the self-synchronous intercluster buses.

The global buses 16 have a hierarchical, self-synchronous control that mitigates collisions while maximizing throughput. The use of self-synchronous buses maximizes throughput speeds, reduces power by eliminating aligned clock trees, and eliminates the requirement for a global timing closure. Self-synchronous buses also enable reconfiguration referred to as a "wave crest reconfiguration," which allows data to flow through processing elements as crests of waves. Once all data has been processed by a particular algorithm for which the elements have been configured, the next wave crest can carry reconfiguration instructions, followed by more data to be processed by an updated algorithm. Thus, the circuit structure or "fabric" is reconfigurable in two spatial and one temporal dimension.

If the self-synchronous buses are based on Null Convention Logic, which is a logically complete (the logic carries the logical expression and the timing information) one of N logic where N is usually equal to 2, data travels on wavefronts separated by NULLs. Wave crest reconfiguration is an extension of the logical completeness. One instantiation is to use a "one of three hot" (data or address or instruction) control line on each bus in addition to the "one of two hot" (zero or one) data lines.

For example, assume 16 bit data buses. There would be 32 data lines (16 zero lines and 16 one lines) plus 3 control lines (data and address and instruction) lines on each bus. Now assume that a block of processing elements has been configured. Data is passing through the element clusters as data/NULL wavefronts on the self synchronous buses. Now assume that all the data to be processed by that configuration has been processed. The last of the data processed by the initial processing elements in the flow is followed by a NULL as is required. However, during the next wavefront the address line on the one hot control line is set so the clusters look at the address on the data lines and when the address on the data lines matches its own address, it sets an internal flag that says the next instruction on the bus is for the circuit in question. A NULL follows and on the next wavefront the instruction control line is hot. The cluster with the set flag reads the bus contents and loads it into its configuration register and reconfigures itself for a new processing algorithm. A NULL follows. The next time data on the bus arrives with the data control line set hot, the cluster processes the data according to its new configuration.

Since data flows on the self-synchronous buses as wavefronts RE NCL convention, the name "wave crest reconfiguration" describes the process of interleaving data, instruction addresses and instructions on the "crests" of the wavefronts under the control of the one of three hot control lines.

This is the Princeton Architecture analogy for a wavefront array. It enables reconfigurability "on the fly" without interrupting flow along the self-synchronous buses.

FIG. 2 is another view showing the circuit structure or "fabric" 10 embedded in an ASIC device 30. An Input/Output Ring 22 of the type shown in FIG. 1 forms a perimeter. An application space 32 has a plurality of common functional blocks or modules. Such functional blocks or modules include in this non-limiting example Data Converters 34, a Digital Local Oscillator (LO) 36, a CIC Filter Bank 38 as a cascaded integrator-comb filter, and a Baseband Signal Processor 40. A MAC (Media Access Control) Processor 42 and Coders/Decoders as Convolutional Turbo block 44 are included. Flash memory 46 and RAM 48 are included. A Timers/Clock block 50 can provide timing control. Other functional blocks 52 can be included.

Typically, the CIC Filter Bank 38 includes an integrator and comb circuit structure. The integrator could be a single-pole, Infinite Impulse Response (IIR) filter having a unity feedback coefficient. The CIC Filter Bank 38 can be formed as a cascade of digital integrators followed by a cascade of combs as digital differentiators in equal number. Between the integrators and combs could be a digital switch or decimator, which is used to lower the sampling frequency of the comb signal with respect to the sampling frequency of the integrators. Thus, each integrator can contribute to the CIC transfer function with the pole.

The circuit structure 30 as described relative to FIGS. 1 and 2 addresses the requirement for a semiconductor device having the size, processing capability, and power consumption efficiency near that of an ASIC with the programmability near that of a programmable processor with an application space that lends itself to a data flow architecture. It can be a lower cost/lower power replacement for Field Programmable Gate Arrays and processors across multiple product lines with multiple and moderate volume commercial applications.

Figure 3:
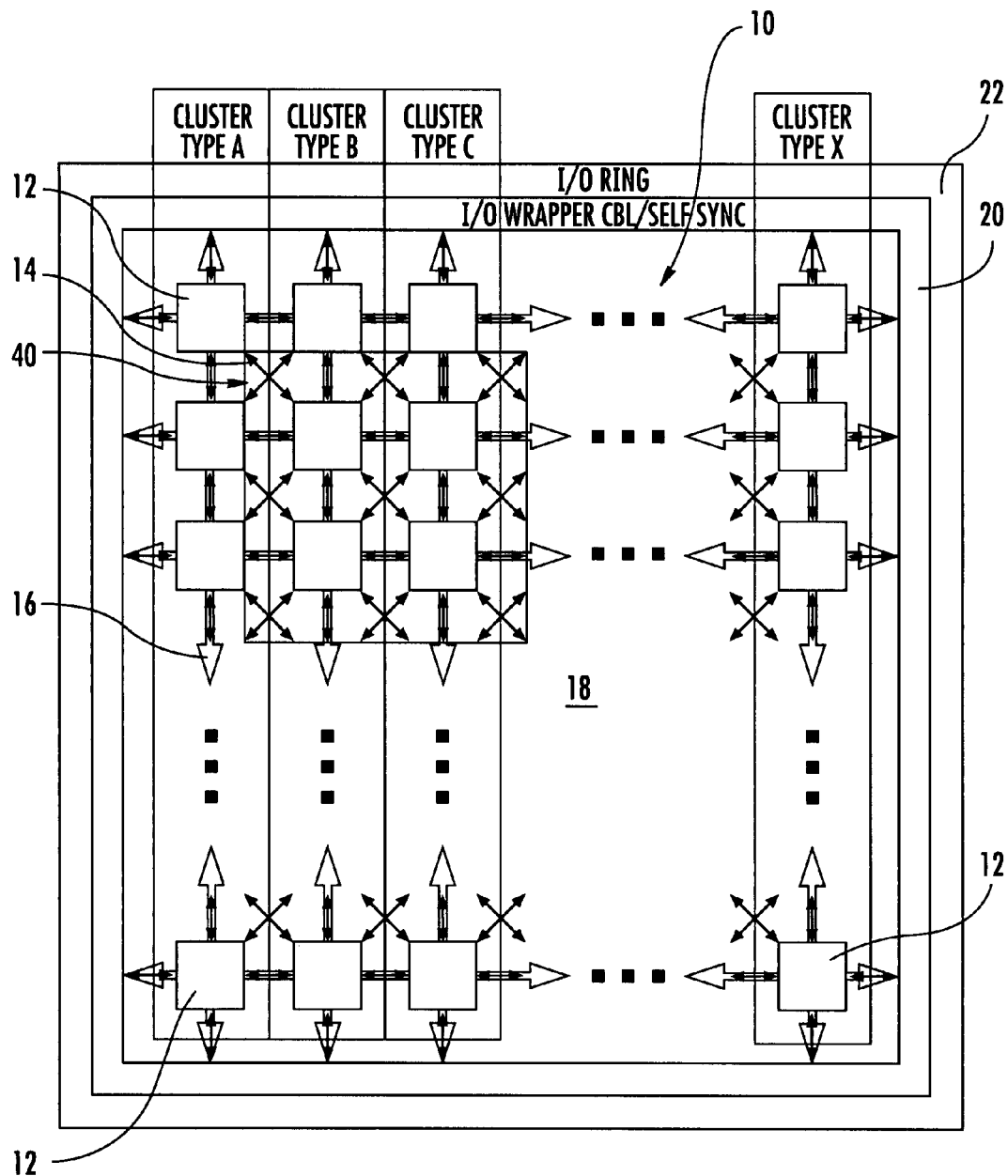
FIG. 3 is another circuit view similar to the circuit structure shown in FIG. 1, and showing a greater number of processing clusters in accordance with a non-limiting example of the present invention.
Figure 4:
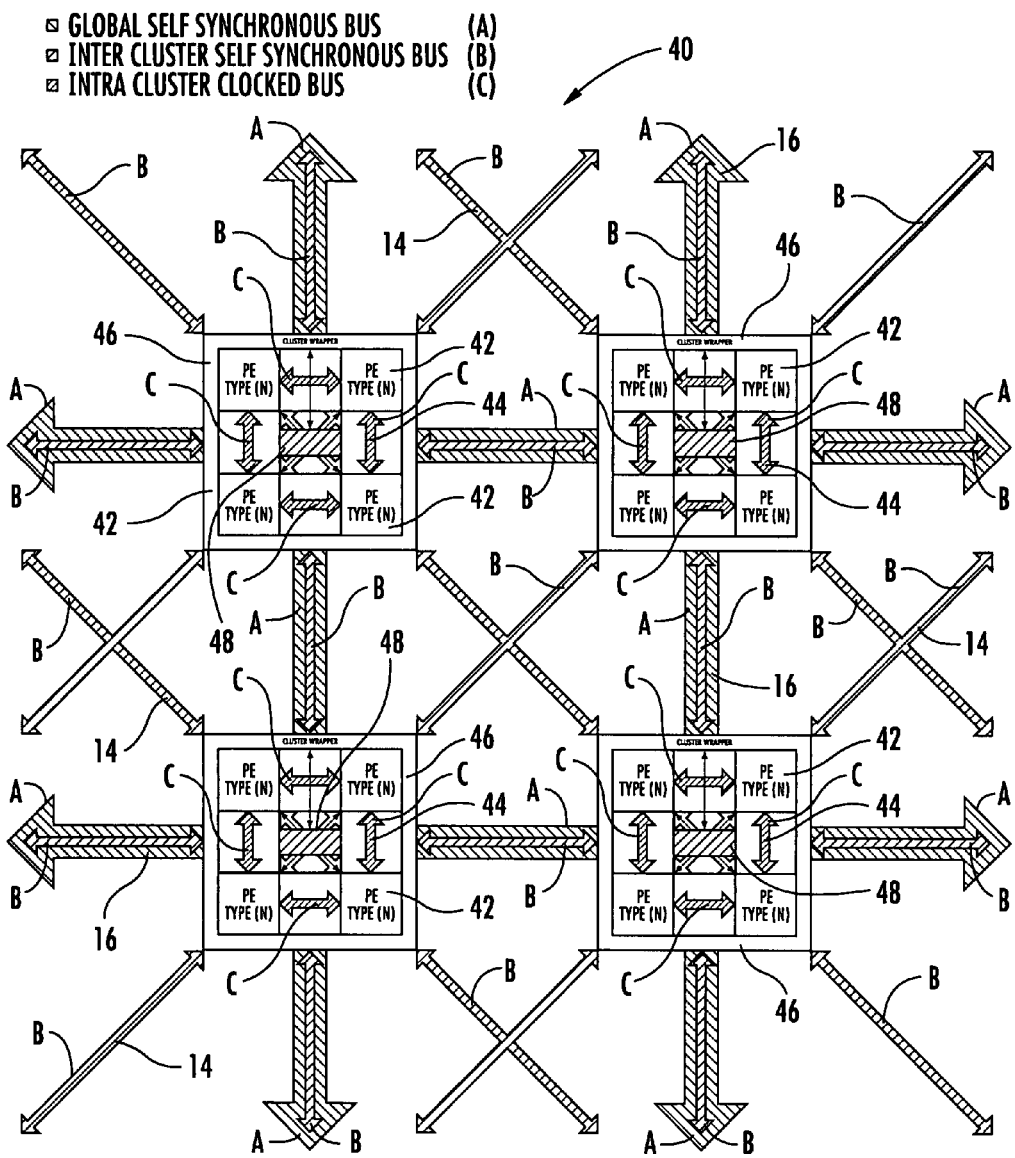
FIG. 4 is a high-level view showing greater details of processing clusters in accordance with a non-limiting example of the present invention.

FIGS. 3 and 4 show further details of the circuit structure 10, including details of a processing element and cluster interface as shown in FIG. 4. The structure in FIG. 3 is similar to the structure in FIG. 1 except an additional cluster Type C is shown in FIG. 3.

As is illustrated in FIG. 3, the programmable "fabric" or circuit structure 10 is designed as an M×N matrix of processing clusters 12. Each illustrated column as a cluster Type A, Type B, Type C or Type X is constructed from identical processing clusters. As a result, regular bus channels along the vertical axis are facilitated. Regular bus channels along the horizontal axis are maintained by 1) constructing clusters such that the vertical dimension of all processing cluster types are consistent with one another, and 2) constructing the centers of each processing cluster to be aligned horizontally and the spacing set by the processing cluster type with the largest vertical dimension.

Each column in the matrix can contain a different processing cluster type as illustrated. The types of processing clusters, location of each type relative to other types, and the relative and absolute number of each typical processing cluster are dictated by the needs of the target application space.

As shown in FIG. 3, each processing cluster communicates externally via eight local buses and two universal buses. Both the processing clusters and the buses are HDL programmable for maximum efficiency and flexibility.

The local and global buses 14,16 can be implemented in a self-timed form of asynchronous logic. An example of such logic is NULL Convention Logic™ (NCL™) by Theseus Logic, Inc. Examples of systems and methods of using such logic are disclosed in U.S. Pat. Nos. 6,333,640 and 5,828,228, the disclosures which are hereby incorporated by reference in their entirety. The circuit structure can be classified as a type of Globally Asynchronous Locally Synchronous (GALS) architecture. A generic GALS system is typically a hybrid of synchronous (clocked Boolean) and asynchronous architectures. In general, a GALS system contains several independent, synchronous blocks or modules which operate using their own local clock, possibly running at different rates, and communicate asynchronously with each other. The benefits of a GALS architecture are: 1) reduced power consumption and 2) local timing requirements. Both benefits come as a result of the elimination of the requirement for a chip scale, clock tree.

The programmable circuit structure or "fabric" 10 as described takes the GALS architecture to an extremely fine grained level and eliminates timing closure requirements once the small number of processing clusters are verified. Implementing the processing clusters in traditional Clocked Boolean Logic (CBL) minimizes gate count and simplifies implementation via standard HDL languages and back end tools. Implementing the cluster buses as self-timed buses also: 1) facilitates higher speed, global communication; 2) allows clock throttling at the cluster level as well as data throughput control via voltage scaling of the bus logic; and 3) facilitates a dynamic reprogramming paradigm.

Both bus types are self-synchronous and bidirectional. The global bus is segmented using multiple request layers to prevent a single element from capturing the entire bus across a row or column. This configuration, coupled with the self-synchronous nature of the bus, maximizes global communication for multiple processing clusters simultaneously, while minimizing power consumption, with negligible effects on throughput. Both local and global buses are defined for single source and multiple destination capability.

The self-synchronous, local bus configuration resembles a wave front array analogous to a systolic data flow architecture. The majority of signal processing constructs efficiently lend themselves to data flow implementations. The global bus facilitates any required deviation from a regular data flow.

In FIG. 3, four processing clusters 12 are defined by an area 40, which is expanded in FIG. 4, showing higher level details for the cluster architecture defined by the area 40. As illustrated, a processing cluster 12 has multiple processing elements 42 interconnected by an intra cluster clocked bus 44. A cluster 46 forms the periphery wrapper, and a local memory 48 supports local computation. In this non-limiting example, the processing clusters have four processing elements 42 each, as would likely be the case in a multiplier cluster or an arithmetic unit cluster. Other cluster types, for example, a Galois field computational unit cluster, may have a different intra cluster configuration of processing elements.

Likely processing elements for communication applications include: (1) multiplier/accumulator (MAC); (2) ALU; (3) Galois field computational unit; (4) memory elements; (5) state machines; and (6) transcendental function computation units.

Processing elements 42 are one structural foundation basis of the reconfigurable "fabric." These processing elements 42 are on the complexity of what used to be known as large scale integration (LSI). In one preferred embodiment, the number of different types of processing elements 42 should be kept small, in the range of four to six, but more could be used in some non-limiting examples. Each processing element 42 can be optimized for minimum gate count and power consumption.

There now follows a more detailed explanation for the programmability of the "fabric."

Figure 5:
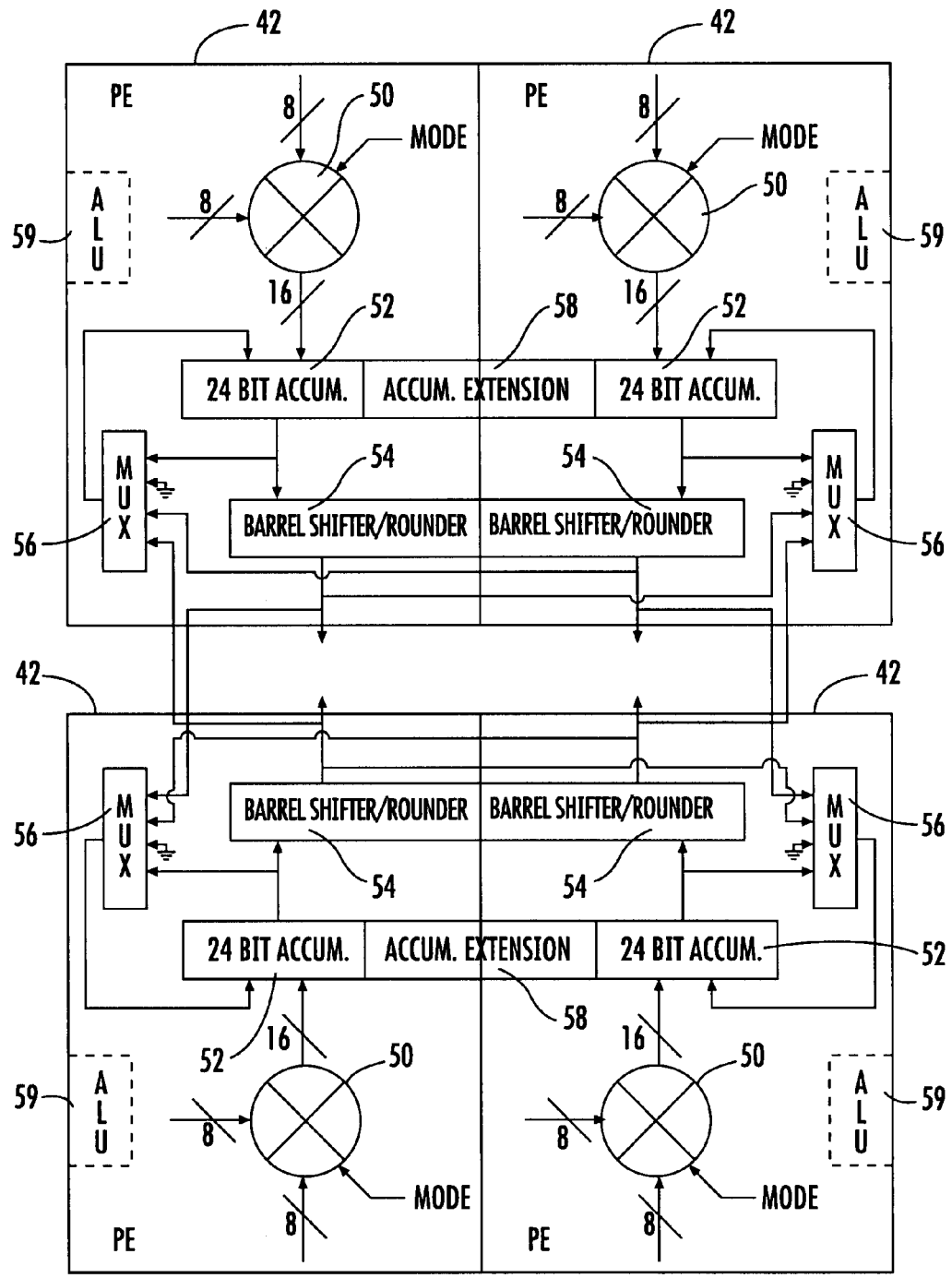
FIG. 5 is a high-level block diagram showing an example of greater details of processing elements in accordance with a non-limiting example of the present invention.

FIG. 5 shows four processing elements 42 forming a "MACC" cluster and illustrating basic elements of a Multiplier 50, 24-bit Accumulator 52, Barrel Shifter/Rounder 54 and Multiplexer 56 for each processing element 42. An Accumulator Extension circuit 58 is operative with the 24-bit Accumulators 52. Such structural components and circuits can form various multiplier and multiplier/accumulator configurations, including but not limited to, asymmetric word length real multipliers, symmetric word length real multipliers, and complex multipliers. In the alternative, processing elements could include a separate ALU 59 or other components and circuit logic as described before.

In a first example, there could be a column of MACC clusters. Each MACC in the cluster has eight bit inputs with extended accumulator registers. 16 by 16 multipliers are used. The HDL targeted to a particular cluster would direct inputs to appropriate 8 by 8 MACCs, configure the accumulators to interconnect, and route the composite output to an appropriate bus. The inputs are routed and accumulators interconnected via HDL to form a 16 by 16 result from 8 by 8 partial products.

In a second example, two adjacent columns of MACC clusters form 16 by 16 complex MACCs. In this example, the HDL to form each MACC is targeted to four elements arranged as the corners of a square, just as the four elements in a processing cluster are arranged. The HDL routes inputs and outputs appropriately to allow each processing element, and in this example, each processing cluster to form the correct partial products for the complex MACC. The Accumulators can be configured to combine simultaneously the appropriate partial products and form real and imaginary results of the multiplication and form real and imaginary accumulations.

By extension, it is clear how larger signal processing constructs are developed in the "fabric."

Another capability enabled by the use of a GALS approach is energy management through the use of monitors in the wrappers. By monitoring the activity of the buses, individual processing clusters can be turned "off" when there is no activity.

Each processing element can be configured as a stand-alone multiplier or multiplier/accumulator. The cluster can be configured as: (1) four eight bit real multipliers or multiplier/accumulators; (2) two eight bit by sixteen bit real multipliers or multiplier/accumulators, (3) a single sixteen bit real multiplier or multiplier/accumulator; (4) a single eight bit complex multiplier or multiplier/accumulator; or (5) one-quarter of a sixteen bit complex multiplier or multiplier/accumulator. Outputs can be shifted, rounded, or truncated.

Multiplications can be 2's complement, binary, binary times 2's complement, or 2's complement times canonic signed digit, and defined by a mode select. The accumulators can be programmable to allow for separate accumulations, joint accumulations, for example, for extended precision operations, or shift and add operations such as required for complex multiplication. The outputs of the accumulators can be truncated or rounded to single precision or double precision values.

The multiplexers are used to route data appropriately for the specific function being performed. Multiplexer requirements are apparent when one examines all of the required data routing paths for all allowable functions.

An ALU processing element can perform addition and subtraction with carry-in, carry-out, and permutations thereof, standard logic functions and multiplexer functions. It can support conditional flag setting and flag dependent actions, perform parallel single bit GF(2) arithmetic and contain a small amount of register based, scratchpad memory.

The ALU functions can be defined at a top level. Detailed definitions can include conditional flag definition and handling and are generated during the design process.

| Logic Functions |
|---|
| Y' |
| A' |
| (A + B)' |

-continued

| |
|---|
| A'B |
| 1 1 1 1 1 1 1 1 |
| 0 0 0 0 0 0 0 0 |
| (AB)' |
| B' |
| A XOR B |
| AB' |
| A' + B |
| (A XOR B)' |
| A |
| B |
| AB |
| A + B' |
| A + B |
| LUT(A,B) 8 gates per bit position |

Inputs   A - 8 bits
         B - 8 bits
Output   Y - 8 bits

Arithmetic Functions

| |
|---|
| Y |
| A' + 1 |
| Binary A + B |
| 2's comp A + B |
| + Cout = binary A + B + Cin |
| + Cout = 2's comp A + B + Cin |
| 2's Comp A − B |
| 2's Comp B − A |
| 2's Comp −A − B |
| + Cout = 2's Comp A − B − Cin |
| + Cout = 2's Comp B − A − Cin |
| + Cout = 2's Comp −A − B − Cin |
| D flip-flop, Cin is the input to the first of 8 |
| D flip-flop w/reset, Cin is the input to the first of 8 |
| D flip-flop w/set, Cin is the input to the first of 8 |
| D flip-flop w/reset & set, Cin is the input to the first of 8 |
| D flip-flop w/enable, Cin is the input to the first of 8 |
| D flip-flop w/set & enable, Cin is the input to the first of 8 |
| D flip-flop w/reset & enable, Cin is the input to the first of 8 |
| Loadable D flip-flop, Cin is the input to the first of 8 |
| Loadable D flip-flop w/reset, Cin is the input to the first of 8 |
| Loadable D flip-flop w/set, Cin is the input to the first of 8 |
| Loadable D flip-flop w/reset & set, Cin is the input to the first of 8 |
| Loadable D flip-flop w/enable, Cin is the input to the first of 8 |
| Loadable D flip-flop w/set & enable, Cin is the input to the first of 8 |
| Loadable D flip-flop w/reset & enable, Cin is the input to the first of 8 |
| 1 of 8 Mux, A is input, B0-B2 is select |
| Truncate A |
| Round A |
| Barrel shift A, B3 controls direction, B0-B2 is shift amount |
| 2's comp. compare |
| 2's comp. magnitude compare |
| Binary magnitude compare |
| Up counter, A is preset, B is max count |
| Down counter, A is preset |
| Up counter w/reset, A is preset, B is max count |
| Down counter w/reset, A is preset |
| 8 × 8 register RAM, A is data input, B0-B2 is address |

Inputs   A - 8 bits
         B - 8 bits
         $C_{in}$ - 1 bit
Output   Y - 8 bits
         $C_{out}$ - 1 bit The programmable "fabric" can use two types of memory, which could be art of the processing clusters, such as a small register based memory block and a larger dual port memory block. It is possible that a dual port memory block can either be an element type or be an integrated part of the "fabric" or circuit structure. In a preferred embodiment, memory wrappers include address counters with integrated state machines for configuration and control to enable optimal FFT (Fast Fourier Transform), FIR (Finite Impulse Response), IIR (Infinite Impulse Response) and rate change filter structures. The control elements of the memory wrappers can be based on previous commercial ASICs and FPGA implementations of common communication signal processing and coding functions such as designed and manufactured by Harris Corporation of Melbourne, Fla.

The register based memory block element can be a 32, 8-bit word configuration. A memory element cluster can be capable of operating as 4 independent elements: two 32, 16-bit word memories; two 64, 8-bit word memories; or a single 64, 16-bit word memory. The elements can have buffer registers to allow emulation of dual port configuration.

A cascadable non-linear functional processing element is possible. This architecture is much more efficient than a classic CORDIC approach to implementing nonlinear functions. Different functions that could be implemented in the processing element such as:

1/x
$1/x^2$
Mag(x)
Mag(x,jy)
A tan(x)
A tan(x,y))
Sin(x)
Cos(x)
Ln(x)

The Hardware Description Language can be a standard text-based expression that makes a temporal behavior or spatial circuit structure of an electronic system. HDL can specify a model for expected behavior of a circuit and program the programmable logic devices where HDL code is fed into a logic compiler and the output uploaded into a device. Two types of HDL's that could be used include VHDL and VERILOG.

The logic can encode the computations and communications such that the logic itself can decide when a calculation is completed. The logic can signal when a calculation is complete and when a new calculation can be started. This overcomes some problems faced by designers in solving the timing closure problem where the arrival time of clock edges at registers scattered through the design are all critical to the proper function of the circuitry. When the clock edges do not arrive exactly when predicted or occur through crosstalk, the system can fail to calculate.

The circuits can run at the data rate and not under control of a global clock. Some circuits can go into a "sleep" mode when no data is sent and await the arrival of another data set. The circuit structure can be used for Software Defined Radio (SDR) architectures, including single platform, multiple waveforms and smaller, lower power devices. Other potential applications include waveforms for improved communications that can become bandwidth efficient with a lower signal-to-noise (SNR) performance. The waveforms can be improved for LIP/LPD, data links and non-conventional communications having special processing for multipath mitigation, transmit/interference cancellation, and adaptive processing. Other applications include tracking location systems and wireless systems.

The programmable circuit structure or "fabric" overcomes the disadvantages of conventional, field programmable gate arrays that have a high penalty for implementing signal processing algorithms as a result of look-up table structures.

Implementing mathematical functions requires larger areas to consume more power and operate at slower speeds than a standard cell design.

The ASIC approach as a platform such as shown in FIG. 2 can implement computational elements with reduced overhead. It is possible to use radiation hardening and commercial CMOS processes. Typical communications and signal processing algorithms can be mapped onto the platform ASIC. Some structures could be formed as FIR filters, bit and symbol synchronization circuits, synthesizer circuits, and coder/decoder circuits. For example, a transposed canonic FIR filter could be more efficient than a transversal structure when implemented in this "fabric." The circuit structure as set forth could use a packet based System on Chip (SOC) bus.

It is also possible to use the system as described in various controllers and Software Defined Radios, which include programmable modems and incorporate wireless standards, such as CDMA and GSM. Systems could include programmable, wideband analog front ends, with a digital IF used to implement a flexible IF stage. Wireless sensors can include modules for clockless low noise and data driven/multirate modules.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A semiconductor device, comprising:
a plurality of processing clusters that each operate synchronously internally and arranged in a M×N matrix, each processing cluster comprising a memory and a plurality of reconfigurable processing elements each formed as an arithmetic logic unit, multiplier, or multiplier/accumulation circuit and clocked buses interconnecting the memory and processing elements within each processing cluster and an asynchronous cluster wrapper as interface circuitry and operative with said processing elements and memory;
asynchronous, bidirectional and self-synchronous global and inter cluster local buses interconnecting each asynchronous cluster wrapper through which data, addresses and programs are transferred with the memory and said processing elements; and
an input/output circuit interconnecting global and inter cluster local buses and comprising a clocked Boolean logic self-synchronous wrapper circuit coupled to the asynchronous global buses through which address information, programs and data are carried and coupled to the inter cluster local buses through which data is carried and wherein said processing clusters, global and inter cluster local buses and input/output circuit are configured to operate together to propagate single word reconfiguration commands on wavefront array flows.

2. The semiconductor device according to claim 1, and further comprising a plurality of functional modules interconnecting said input/output circuit and processing clusters to form an ASIC (Application Specific Integrated Circuit).

3. The semiconductor device according to claim 2, and further comprising an input/output ring having input/output ports interconnecting said functional modules.

4. The semiconductor device according to claim 1, wherein each processing cluster is programmable using a Hardware Description Language (HDL) or software.

5. The semiconductor device according to claim 1, wherein a processing cluster comprises a RISC microcontroller or state machine.

6. The semiconductor device according to claim 1, wherein said buses are programmable using a Hardware Description Language (HDL).

7. The semiconductor device according to claim 1, wherein said processing clusters and processing elements comprise circuits configured in Clock Boolean Logic.

8. An Application Specific Integrated Circuit (ASIC), comprising:
a plurality of processing clusters that each operate synchronously internally and arranged in a M×N matrix and forming a programmable fabric, each processing cluster comprising a memory and a plurality of reconfigurable processing elements and each formed as an arithmetic logic unit, multiplier or multiplier/accumulator circuit and clocked buses interconnecting the memory and processing elements and an asynchronous cluster wrapper as interface circuitry and operative with said processing elements and memory;
a plurality of functional modules forming an ASIC structure into which said programmable fabric is embedded;
asynchronous, bi-directional global and self-synchronous inter cluster local buses interconnecting each asynchronous cluster wrapper through which data, addresses and programs are transferred with the memory and said processing elements; and
an input/output circuit interconnecting the functional modules and global and inter cluster local buses and comprising a clocked Boolean logic self-synchronous wrapper circuit coupled to the asynchronous global buses through which address information, programs and data are carried and coupled to the inter cluster local buses through which data is carried and wherein said processing clusters, global and inter cluster local buses and input/output circuit are configured to operate together to propagate single word reconfiguration commands on wavefront array flows.

9. The ASIC according to claim 8, and further comprising an input/output ring having input/output ports interconnecting said functional modules.

10. A method of forming a semiconductor device, which comprises:
implementing in a M×N matrix a plurality of processing clusters that each operate synchronously internally, wherein each processing cluster comprises a memory and a plurality of reconfigurable processing elements each formed as an arithmetic logic unit, multiplier, or multiplier/accumulator circuit and clocked buses interconnecting the memory and processing elements within each processing cluster and an asynchronous cluster wrapper as interface circuitry and operative with said processing elements and memory;
interconnecting said asynchronous cluster wrapper with asynchronous, bidirectional and self-synchronous global and inter cluster local buses such that data, addresses and programs are transferred with the memory and processing elements; and
interconnecting each global and inter cluster local buses with an interconnect circuit and comprising a clocked Boolean logic self-synchronous wrapper circuit coupled to the asynchronous global buses through which address information, programs and data are carried and coupled to the inter cluster local buses through which data is carried and wherein said processing clusters, global and inter cluster local buses and input/output circuit are configured to operate together to propagate single word reconfiguration commands on wavefront array flows.

11. The method according to claim 10, which further comprises interconnecting functional modules with the processing clusters to form an ASIC.

12. A semiconductor device, comprising:
a plurality of processing clusters that each operate synchronously internally and arranged in a M×N matrix, each processing cluster comprising a memory and a plurality of reconfigurable processing elements each formed as a logic unit, multiplier or multiplier/accumulator circuit and clocked buses interconnecting the memory and processing elements within each processing cluster an asynchronous cluster wrapper as interface circuitry and operative with said processing elements and memory;
asynchronous, bidirectional and self-synchronous global and inter cluster local buses interconnecting each asynchronous cluster wrapper through which data, addresses and programs are transferred with the memory and said processing elements wherein data travels on wavefronts separated by nulls; and
an input/output circuit interconnecting global and inter cluster local buses and comprising a clocked Boolean logic self-synchronous wrapper circuit coupled to the asynchronous global buses through which address information, programs and data are carried and coupled to the inter cluster local buses through which data is carried and wherein said processing clusters, global and inter cluster local buses and input/output circuit are configured to operate together to propagate single word reconfiguration commands on wavefront array flows.

13. The semiconductor device according to claim 12, and further comprising a data, address and instruction control line on each bus.

14. The semiconductor device according to claim 13, and further comprising a zero and one data line on each bus.

15. The semiconductor device according to claim 12, wherein each processing cluster comprises a memory element operable with said processing elements.

* * * * *